(12) United States Patent
Mawson et al.

(10) Patent No.: US 10,740,224 B2
(45) Date of Patent: Aug. 11, 2020

(54) DATA PROCESSING SYSTEM TEST SUITE MANAGEMENT INCLUDING DYNAMIC RESOURCE REALLOCATION AND RECONFIGURATION

(71) Applicant: INTERNATIONAL BUSINESS MACHINES CORPORATION, Armonk, NY (US)

(72) Inventors: Richard Mawson, Katy, TX (US); Philip Kelleher, Richmond, TX (US); Robert Guy Keevil, Houston, TX (US); Timothy Biesecker, Pointblank, TX (US); Rotimi Ojo, Pima County, AZ (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/102,934

(22) Filed: Aug. 14, 2018

(65) Prior Publication Data

US 2020/0057712 A1 Feb. 20, 2020

(51) Int. Cl.
*G06F 11/00* (2006.01)
*G06F 11/36* (2006.01)
*G06F 11/22* (2006.01)
*G06F 9/48* (2006.01)

(52) U.S. Cl.
CPC ........ *G06F 11/3688* (2013.01); *G06F 9/4881* (2013.01); *G06F 11/22* (2013.01)

(58) Field of Classification Search
CPC .............................. G06F 11/22; G06F 11/3688
See application file for complete search history.

(56) References Cited

U.S. PATENT DOCUMENTS

| | | |
|---|---|---|
| 2003/0028582 A1 | 2/2003 | Kosanovic |
| 2014/0007097 A1 | 1/2014 | Chin et al. |
| 2014/0289386 A1 | 9/2014 | Vatto et al. |
| 2016/0034379 A1* | 2/2016 | Shah ..................... G06F 16/254 707/602 |
| 2016/0306661 A1 | 10/2016 | Di Balsamo et al. |
| 2017/0116033 A1 | 4/2017 | Harris et al. |

FOREIGN PATENT DOCUMENTS

| | | |
|---|---|---|
| WO | 0131842 A2 | 5/2001 |
| WO | 2007051389 A1 | 5/2007 |

OTHER PUBLICATIONS

Al-Ghamdi, M., et al. "The effect of server reallocation time in dynamic resource allocation." UKPEW, 2009. https://pdfs.semanticscholar.org/acf5/03ec02aff8df3485c3cfa996b2ac1707365d.pdf.

* cited by examiner

*Primary Examiner* — Katherine Lin
(74) *Attorney, Agent, or Firm* — Stosch Sabo; Brian F. Russell

(57) ABSTRACT

In response to receiving a test suite specification, a processor of a testing platform determines a schedule of execution of a test suite to test a system under test (SUT). The SUT has a hardware resource set including at least one of a set including a processor system and a data storage system, and the test suite includes a plurality of tests, each including a respective set of one or more testcases. The processor initiates execution of the test suite on the SUT in accordance with the schedule. In response to failure of a hardware resource during execution of the test suite, the processor automatically and dynamically reallocating a test in the test suite to at least one different hardware resource in the hardware resource set.

18 Claims, 8 Drawing Sheets

US 10,740,224 B2

DATA PROCESSING SYSTEM TEST SUITE MANAGEMENT INCLUDING DYNAMIC RESOURCE REALLOCATION AND RECONFIGURATION

BACKGROUND OF THE INVENTION

This disclosure relates to data processing and data storage, and more specifically, to test suite management including dynamic resource reallocation and reconfiguration.

Enterprise-class data processing and/or data storage systems are commonly subjected to rigorous testing, for example, at deployment or after a system reconfiguration or software/firmware upgrade. Such testing can be utilized to confirm not only that the system is properly configured and fully functional, but also that the system is providing an expected level of performance and/or resource utilization.

Currently, testing of enterprise-class data processing and/or data storage systems is time-consuming, even when supported by automation. For example, it is not uncommon for testing of a large scale system to consume between 12 and 36 hours of continuous operations. To accommodate this testing without unduly interfering with regular workloads during business hours, test administrators commonly schedule the tests to be performed on the system under test overnight or on a weekend. However, because tests can have issues with stability and reliability, a human test administrator may be required to constantly monitor the testing to verify that the testing and the system under test are still running correctly.

BRIEF SUMMARY

The efficiency, stability, and reliability of testing are improved by providing test suite management including dynamic resource reallocation and reconfiguration. In at least one embodiment, in response to receiving a test suite specification, a processor of a testing platform determines a schedule of execution of a test suite to test a system under test (SUT). The SUT has a hardware resource set including at least one of a set including a processor system and a data storage system, and the test suite includes a plurality of tests, each including a respective set of one or more testcases. The processor initiates execution of the test suite on the SUT in accordance with the schedule. In response to failure of a hardware resource during execution of the test suite, the processor automatically and dynamically reallocating a test in the test suite to at least one different hardware resource in the hardware resource set.

DETAILED DESCRIPTION

Figure 1A:
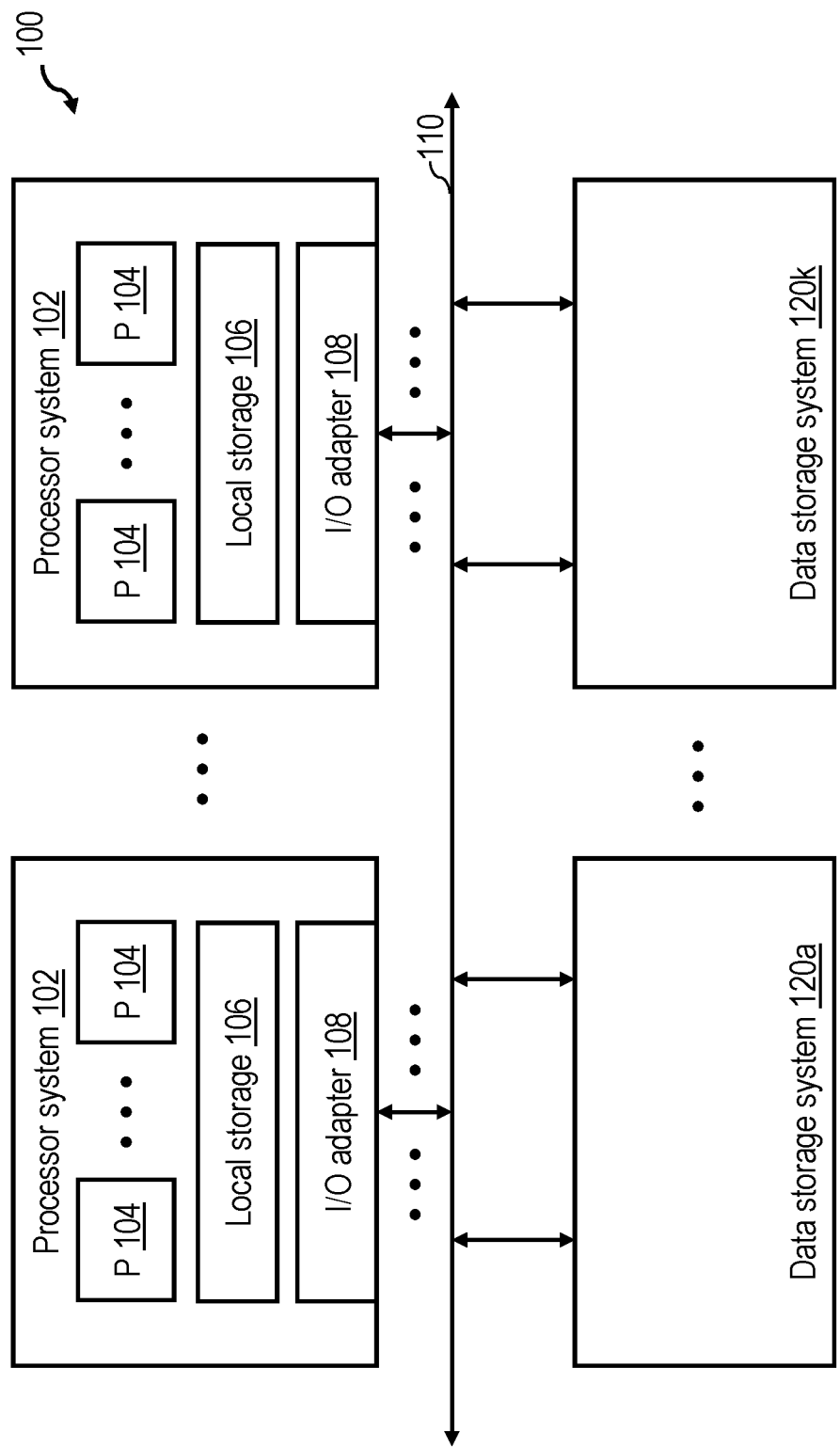
FIG. 1A is a high level block diagram of a data processing environment in accordance with one embodiment.

With reference to the figures and with particular reference to FIGS. 1A-1D, there are illustrated high level block diagrams of an exemplary data processing environment 100 in accordance with one embodiment. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel x86, or any other processor combined with memory caches, memory controllers, local storage, I/O bus hubs, etc. As discussed further below, one or more of processor systems 102 may be configured (e.g., via software, hardware, and/or firmware) as a management console in order to run a suite of tests on the hardware resources of data processing environment 100.

Each processor system 102 further includes an input/output (I/O) adapter 108 that is coupled directly (i.e., without any intervening device) or indirectly (i.e., through at least one intermediate device) to one or more data storage systems 120a-120k via a communication link 110. In some embodiments, one or more data storage system 120 may be integral to a processor system 102. In various embodiments, communication link 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O requests communicated via communication link 110 can include host read requests by which a processor system 102 requests data from a data storage system 120 and host write requests by which a processor system 102 requests storage of data in a data storage system 120.

Figure 1B:
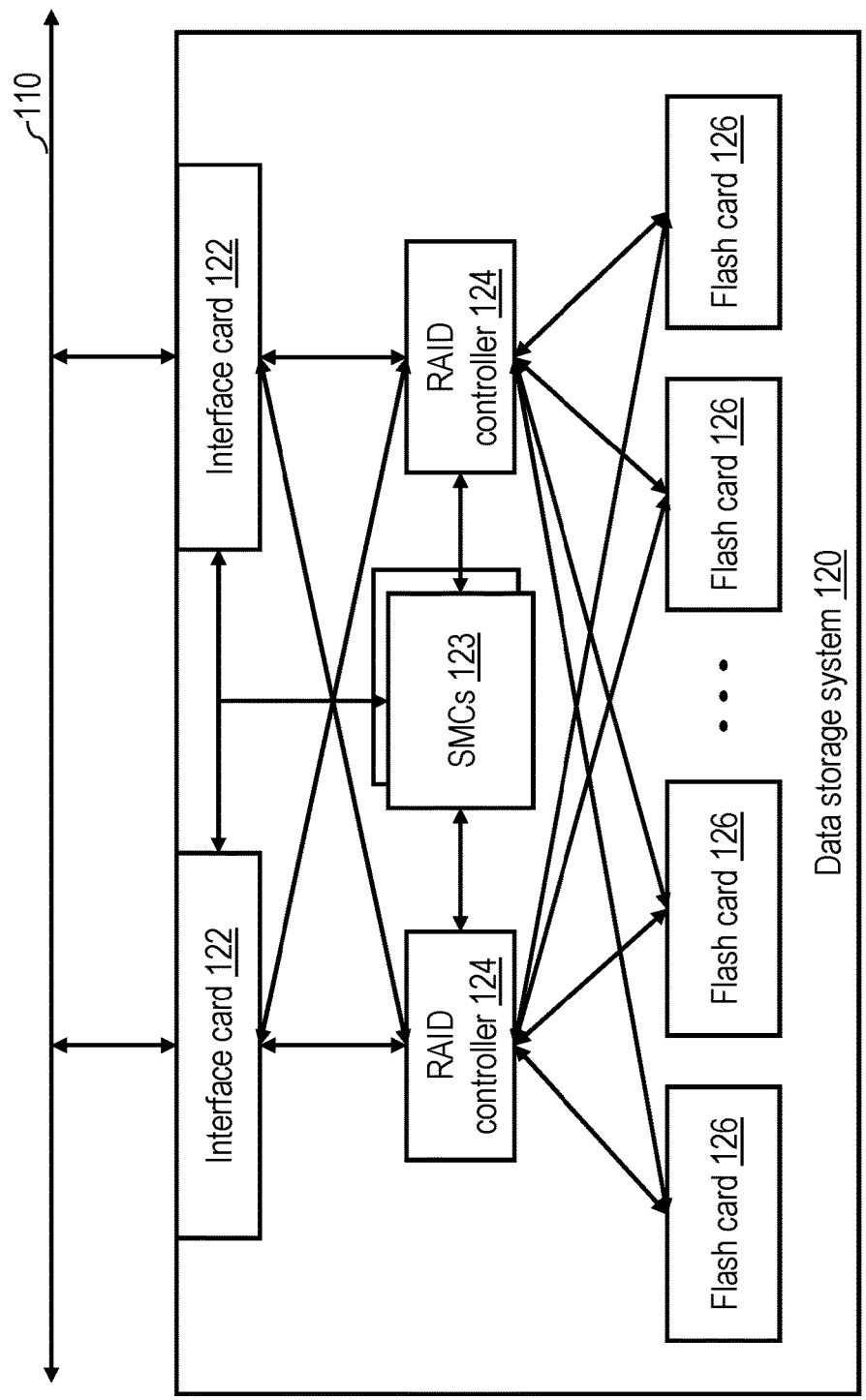
FIG. 1B is a more detailed block diagram of an example of a data storage system in FIG. 1A.

Referring now specifically to FIG. 1B, there is depicted a more detailed block diagram of an exemplary data storage system 120 in data processing environment 100. Although not required, in the illustrated embodiment, data storage system 120 includes multiple interface cards 122 through which data storage system 120 receives and responds to I/O requests of hosts via communication link 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1C:
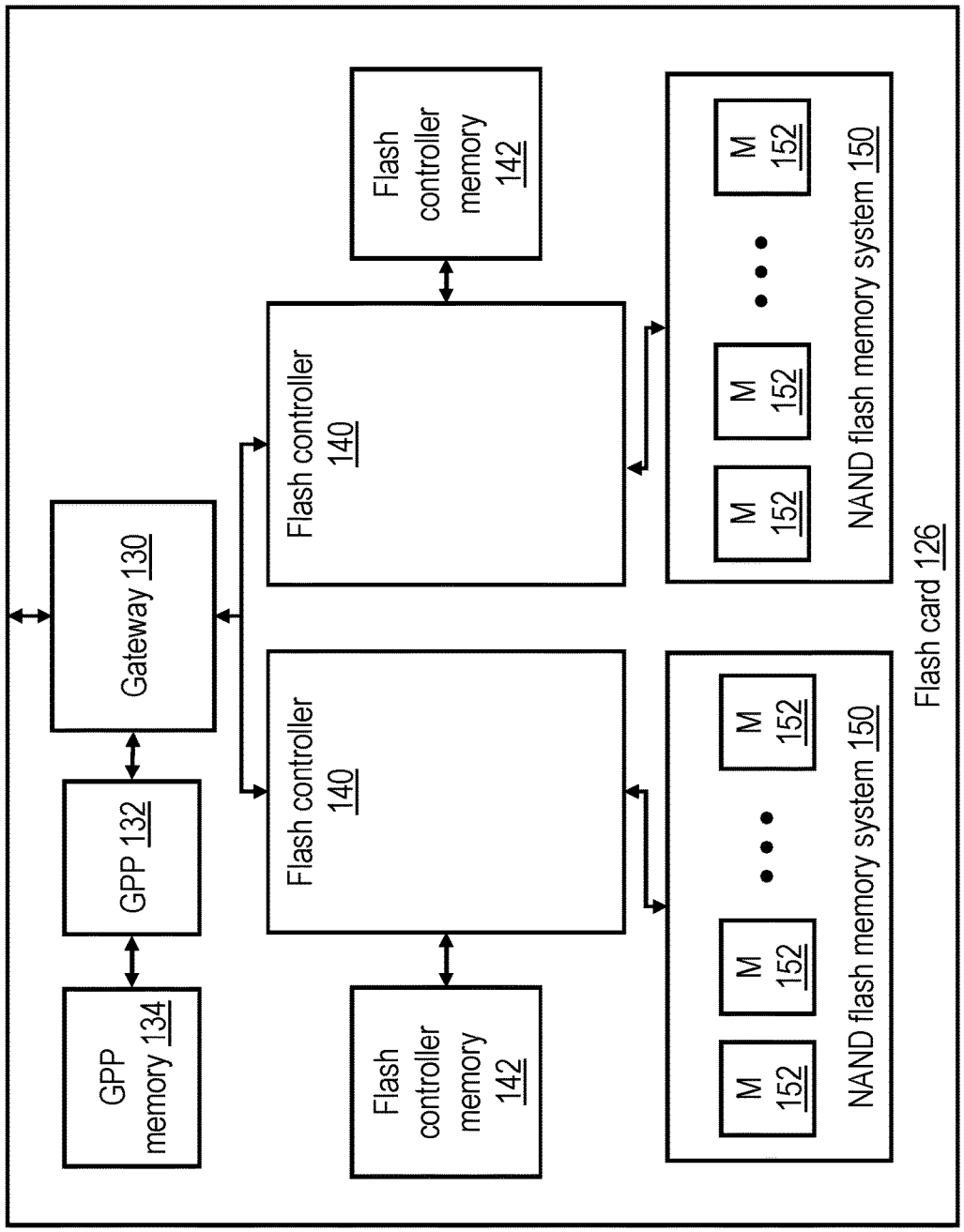
FIG. 1C is a more detailed block diagram of flash card in the data storage system of FIG. 1B.

FIG. 1C illustrates a more detailed block diagram of an exemplary embodiment of a flash card 126 of data storage system 120 of FIG. 1B. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive host read and write requests from gateway 130 that request to read data stored in NAND flash memory system 150 and/or to store data in NAND flash memory system 150. Flash controllers 140 service these requests, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Multi-Level Cell (MLC), Three Level Cell (TLC), or Quad Level Cell (QLC) NAND flash memory modules. The effective storage capacity provided by flash memory storage devices 152 can be increased through the implementation of data compression, for example, by flash controllers 140 and/or high level controllers, such as GPPs 132, RAID controllers 124 or SMCs 123.

Figure 1D:
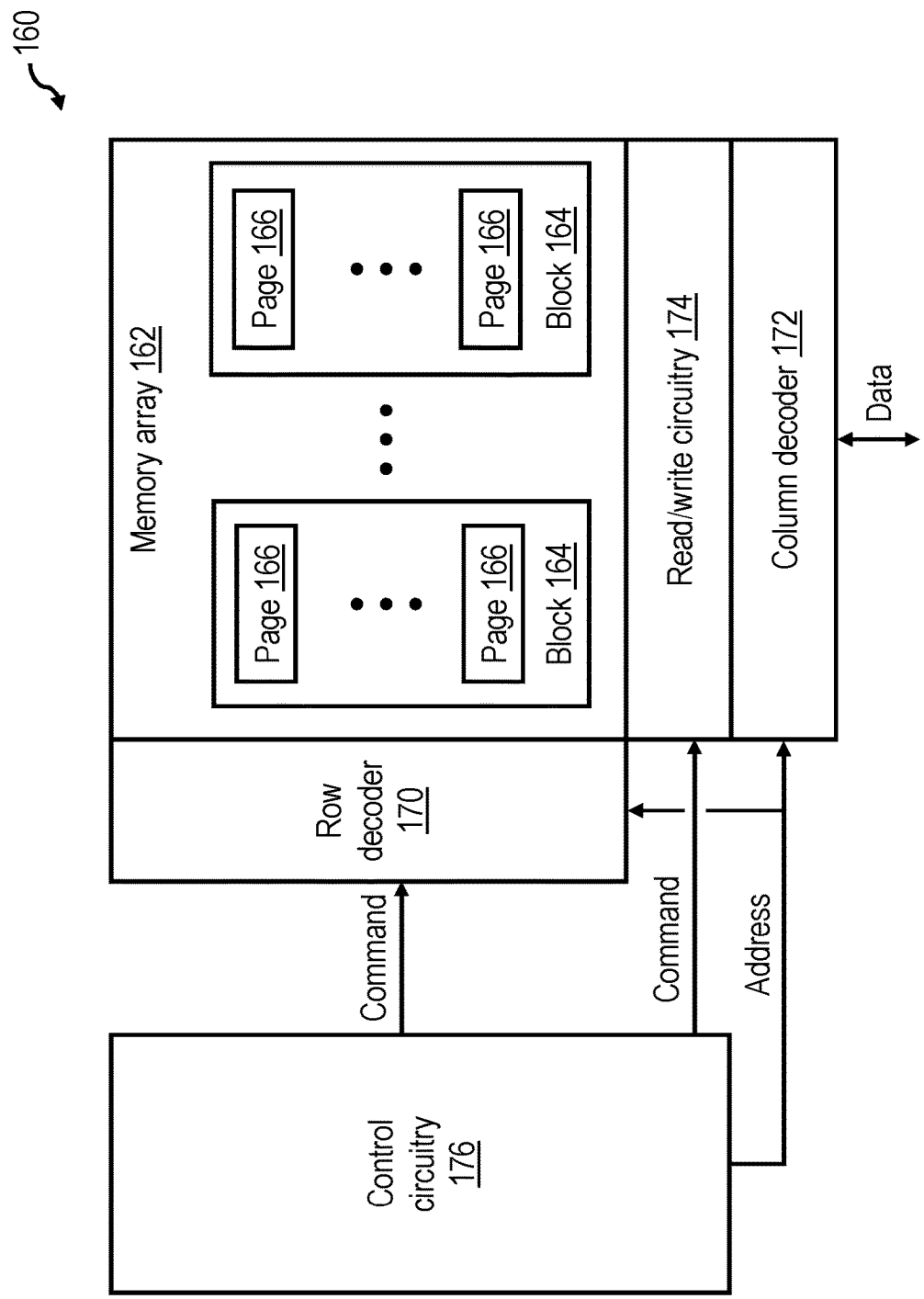
FIG. 1D depicts an exemplary NAND flash memory module in accordance with one embodiment.

Referring now to FIG. 1D, there is illustrated a block diagram of an exemplary flash memory module 160 that can be utilized to implement any of the NAND flash memory storage devices 152 of FIG. 1B. Flash memory module 160 includes one or more memory die, each implementing at least one memory array 162 formed of a two-dimensional or three-dimensional array of NAND flash memory cells. As indicated in FIG. 1D, the memory cells within memory array 162 are physically arranged in multiple blocks 164, each in turn including multiple physical pages 166. These physical pages can be managed in page groups, which can each be formed, for example, of all the pages coupled to a common wordline, of all pages in one or more layers in a 3D NAND flash, of a set of pages in one or more layers, or generally of physical pages with similar characteristics.

As is known to those skilled in the art, NAND flash memory, such as that employed in memory array 162, must be erased prior to being programmed. Further, NAND flash memory can be (but is not required to be) constrained by its construction such that the smallest granule of storage that can be erased is a block 164 and the smallest granule of storage that can be accessed by a read or write request is fixed at the size of a single physical page 166. It should be appreciated in this regard that the LBAs provided by host devices correspond to logical pages within a logical address space, where each logical page typically has a size of 4 kilobytes (kB). Physical pages 166, in contrast, typically have a larger size, for example, 16 kB, and can thus store multiple logical pages.

Flash memory module 160 further includes a row decoder 170 through which word lines of memory array 162 can be addressed and a column decoder 172 through which bit lines of memory array 172 can be addressed. In addition, flash memory module 160 includes read/write circuitry 174 that enables the memory cells of a physical page 166 to be programmed or read in parallel. Flash controller 160 additionally includes control circuitry 176 that provides chip-level control of operation of memory array 162, including read and write accesses made to physical pages 166 in memory array 162, erasure of blocks 164, and the amplitude, duration and polarity of related voltages applied to memory array 162.

Figure 2:
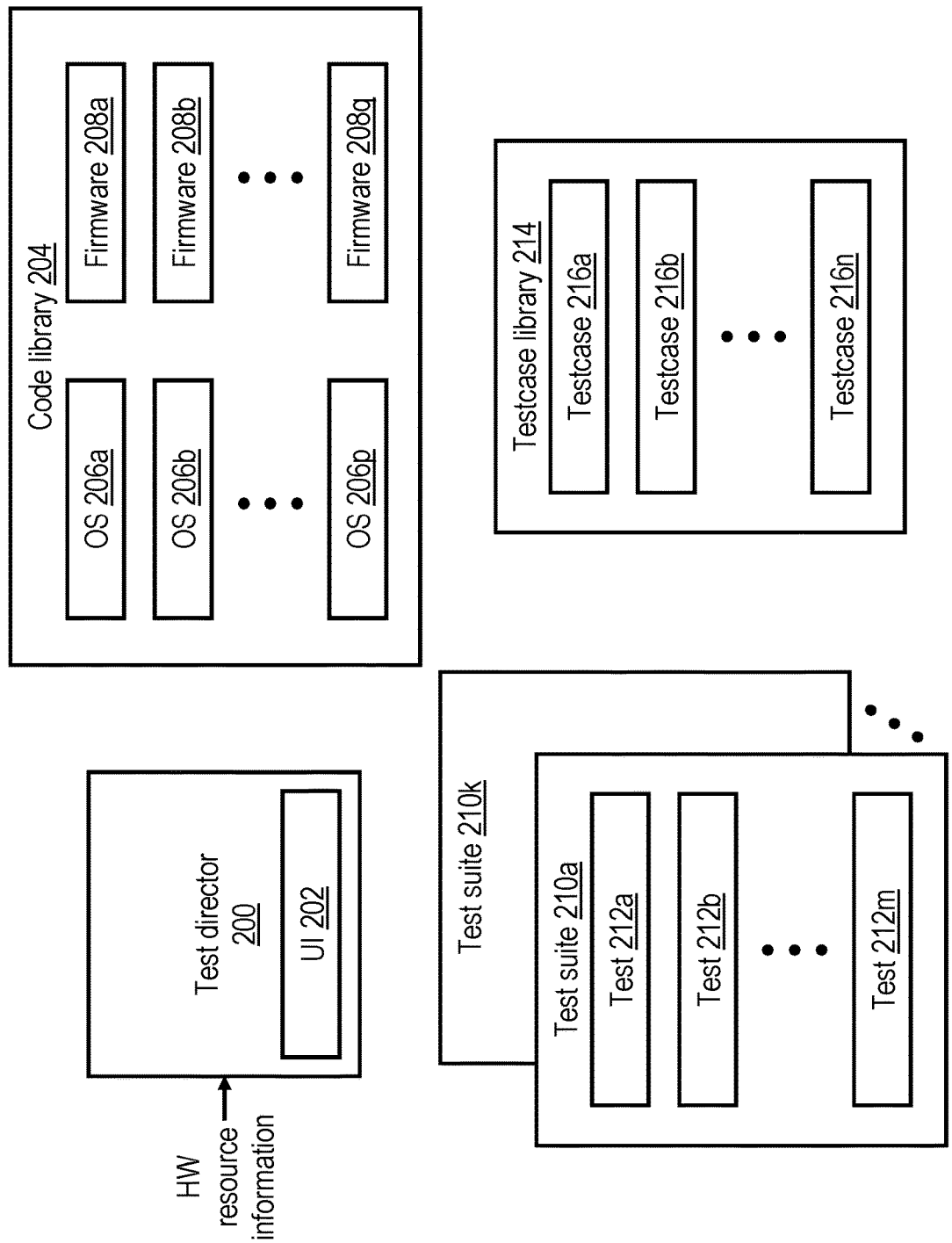
FIG. 2 is an example of data structures and program code utilized to run a test suite on a data processing and/or data storage system under test in accordance with one embodiment.

Referring now FIG. 2, there is depicted an example of data sets and program code that can be executed by a testing platform to run a suite of tests on a data processing system-under-test (SUT) in accordance with one embodiment. In at least one embodiment, the illustrated data sets and program code can reside in the local storage 106 of one or more processor systems 102 and/or in one or more of data storage systems 120.

The program code illustrated in FIG. 2 includes a test director 200 executable by a processor 104 of a processor system 102 employed as a testing platform. In some cases, the testing platform can form at least a portion of a SUT. When executed, test director 200 schedules and executes a suite of tests (a "test suite") on the SUT, which may include a data processing platform, such as one or more processor systems 102, and/or a data storage platform, such as one or more of data storage systems 120. As indicated in FIG. 2, test director 200 receives as an input hardware resource information for the SUT, which indicates the hardware components physically present and operative within the SUT. In some embodiments, this hardware resource information may be collected and recorded in data storage by an operating system (OS) or hypervisor that runs on and/or controls the SUT. This hardware resource information can then be read from the data storage by test director 200. In other embodiments, test director 200 may itself gather hardware resource information from the SUT directly. In yet other embodiments, test director 200 may form a component of an OS or hypervisor that runs on and/or controls the SUT.

Test director 202 preferably includes a user interface (UI) 202 through which a human test analyst or other program code can schedule tests of the SUT. For example, UI 202 may include a web interface through which desired tests can be specified, scheduled, and/or initiated from a conventional web browser.

The program code depicted in FIG. 2 additionally includes a code library 204. Code library 204 can include multiple different operating system images identified as OSs 206a-206p. These operating system images can include different versions of the same operating system and/or images of different OSs (e.g., Linux, Advanced Interactive eXecutive (AIX), Windows, Chrome, iOS, etc.). Code library 204 can additionally include various firmware images identified as firmware 208a-208q. These firmware images can include firmware for configuring particular hardware components (e.g., flash controllers 140, I/O adapters 108, or interface cards 122) and/or for higher level controllers (e.g., RAID controllers 124 or SMCs 123). In addition, firmware 208a-208q can include multiple different versions of firmware for the same component or higher level controller.

As further illustrated in FIG. 2, the data sets that can be utilized by test director 200 in testing a SUT include one or more test suites 210a-210k. Each test suite 210 specifies one or more tests 212a-212m to be performed on the SUT as a set or group. In a preferred embodiment, each of the tests has an associated priority, which can be specified numerically (e.g., in the range 0 (highest) to 3 (lowest)). The test suite 210 can further specify how many times each test 212 is to be performed.

Each test 212 in turn executes one or more testcases 216 from a testcase library 214, which includes multiple testcases 216a-216n. As defined herein, a "testcase" is a set of conditions or variables under which a tester will determine whether a SUT satisfies requirements or works correctly. Although the format of a testcase will vary between applications and test management tools, in one example a testcase can include at least the components listed in Table I:

TABLE I

| Component | Description |
| --- | --- |
| Testcase ID | Unique ID of the testcase |
| Test Suite ID | Unique ID of the test suite to which testcase belongs |
| Objective | Objective of the testcase |
| Requirements | HW/SW/network resource requirements of testcase |
| Prerequisites | Precondition(s) of executing the testcase |
| Procedure | Step-by-step procedure to execute the testcase by applying the Stimulus to the SUT |
| Stimulus | Test data applied to SUT by the Procedure |
| Expected Result | Expected result of the Procedure |
| Actual Result | Actual result of the Procedure |
| Status | Pass or Fail for a completed Procedure; Not Executed if Procedure was not initiated; Blocked if Procedure is incomplete |

TABLE I-continued

| Component | Description |
| --- | --- |
| Test Environment | Hardware/software/network environment in which the Procedure was executed. |

Figure 3:
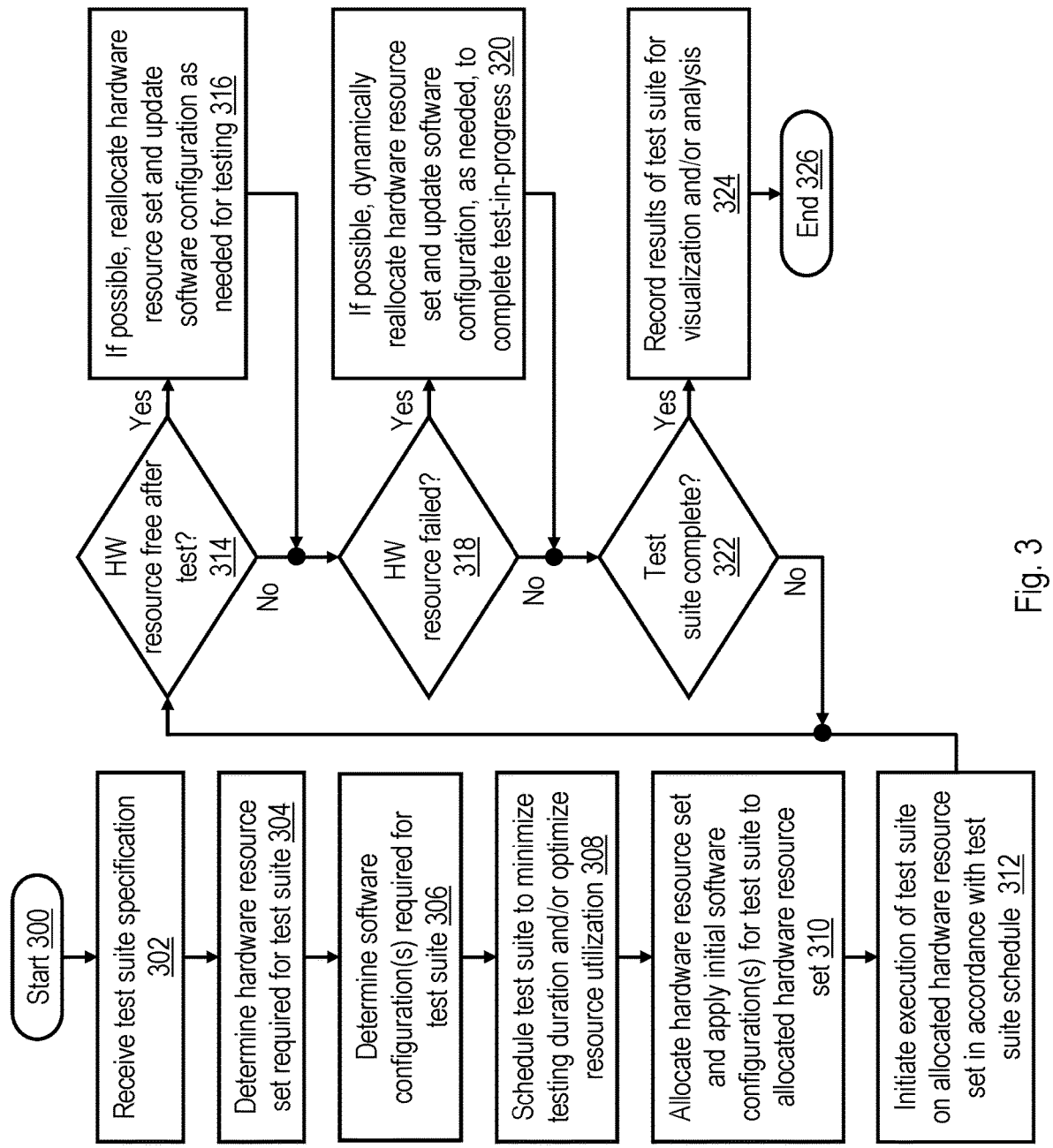
FIG. 3 is a high level logical flowchart of an exemplary process for running a test suite on a data processing and/or data storage system under test in accordance with one embodiment.

Referring now to FIG. 3, there is depicted a high level logical flowchart of an exemplary process for running a test suite on a data processing system in accordance with one embodiment. In the exemplary data processing environment of FIG. 1A, the process of FIG. 3 can be performed, for example, by a test director 200 executing by a processor 104 of a processor system 102. The SUT can include, for example, one or more processor systems 102 and/or one or more data storage systems 120. By following the illustrated method, the test director 200 can execute a test suite 210 as efficiently as possible based on the resource available to perform the testing and can dynamically reconfigure its resource utilization if a resource fails during testing for any reason.

The process of FIG. 3 begins at block 300 and then proceeds to block 302, which illustrates test director 200 receiving as an input a test suite specification, for example, via UI 202. In some embodiments, the test suite specification can simply identify a preexisting test suite 210 to be run, for example, by name and/or test suite ID. In other embodiments, the test suite specification received by test director 200 at block 302 may provide all details necessary to create a new test suite 210 by enumerating and/or defining one or more tests 212 and/or one or more testcases 216.

Based on the test suite specification received at block 302, test director 200 determines at block 304 the hardware resource set required by the test suite 210. For example, the hardware resource set may indicate a minimum number of processors 104 and/or processor systems 102 and/or data storage systems 120 for the test suite 210 to run successfully. This information can be collected, for example, by examining the Requirements of each of the testcases 216 comprising the tests 212 in the test suite 210. In addition, at block 306, test director 200 determines the software/firmware configuration(s) required to the test suite 210. Again, test director 200 can makes this determination, for example, from the Requirements of the testcases 216 comprising the test suite 210.

As one example, a test suite 210 may include four tests 212 as follows:

Test 1: Priority=1, requiring:
Red Hat® Enterprise Linux 7 executing on a POWER platform
IBM FlashSystem data storage system running firmware version 1.5.0.0

Test 2: Priority=2, requiring:
SUSE Linux Enterprise v. 12.2 or later executing on an x86 platform;
IBM FlashSystem data storage system running firmware version 1.5.0.0

Test 3: Priority=2, requiring:
SUSE Linux Enterprise v. 12.2 or later executing on an x86 platform;
IBM FlashSystem data storage system running firmware version 1.4.6.0

Test 4: Priority=3, requiring
IBM AIX V7.1 or later executing on a POWER platform
IBM FlashSystem data storage system running firmware version 1.5.0.0

The test suite 210 may further specify that each of Tests 1 to 4 is to be run for ten iterations for a total of forty test runs.

Test director 200 next schedules the test suite 210 to minimize testing duration and/or to optimize resource utilization (block 308). In a preferred embodiment, the test director 200 develops the schedule for the tests 212 comprising the test suite 210 based in part on the available hardware resource set, the most efficient order of the tests 212 based on the hardware resources and software/firmware configurations required for each test 212, the time required to run each test 212, the number of iterations of each test 212, the priorities of the tests 212, the probabilities of failure of the various required hardware resources during testing, and/or the time required to reconfigure the SUT with different software or firmware. For example, for the exemplary test suite 210 given above, test director 210 may schedule Tests 1 to 4 based on the availability in the SUT of two POWER platforms (e.g., processor systems 102), one x86 platform, and three IBM FlashSystem data storage systems (e.g., data storage systems 120). In addition, test director 210 may further include in its scheduling computation a two hour time cost to reconfigure a POWER platform between running Red Hat® Enterprise Linux 7 and IBM AIX V7.1, a one hour time cost to reconfigure an x86 platform between running Red Hat® Enterprise Linux 7 and SUSE Linux Enterprise v. 12.2, and a 0.5 hour time cost to reconfigure an IBM FlashSystem between versions 1.4.6.0 and 1.5.0.0.

Figure 4A:
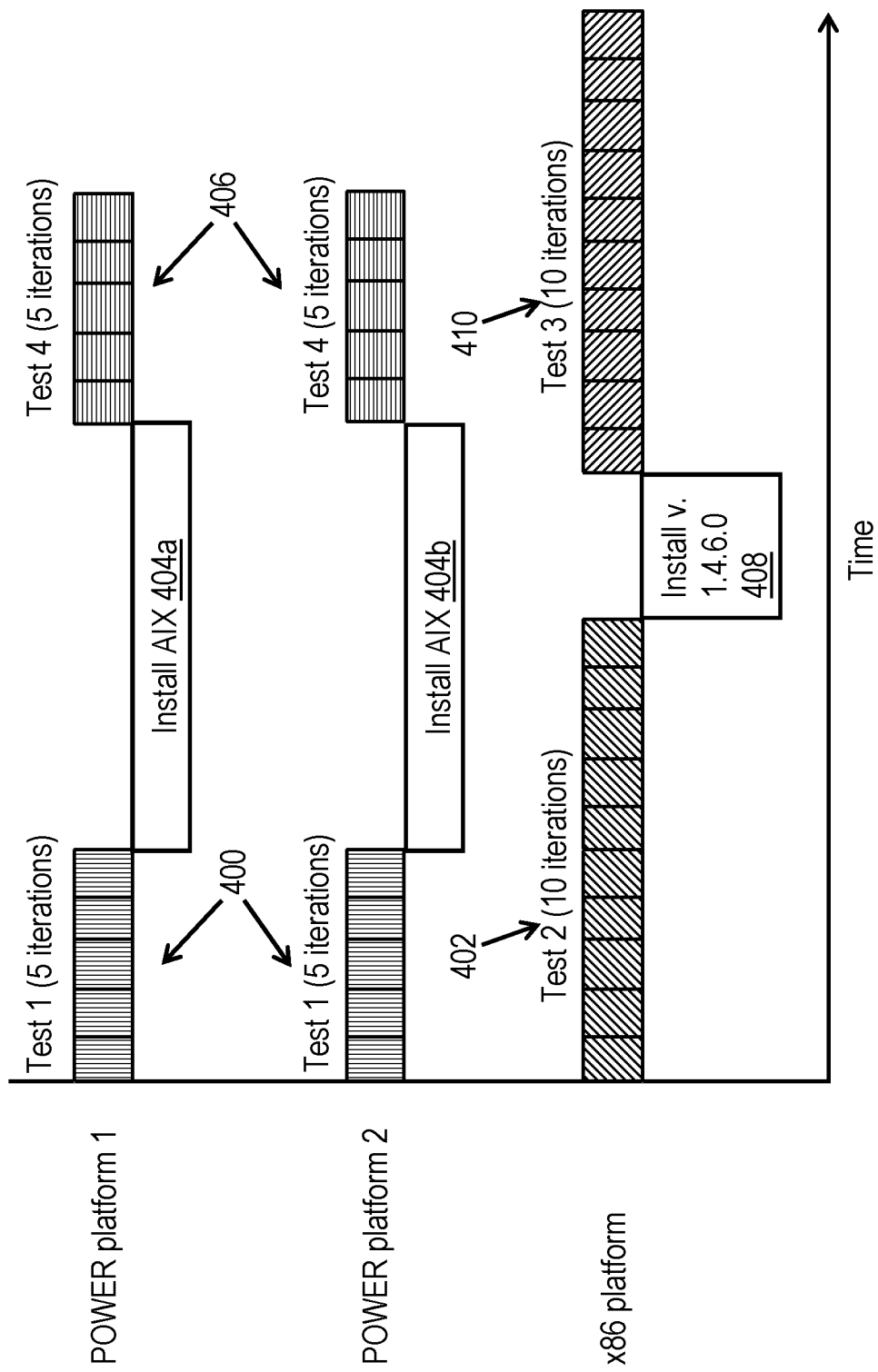
FIGS. 4A-4B illustrate execution of an exemplary test suite.

As a result of the processing performed at block 308, test director 200 may schedule execution of the test suite 210 as depicted in FIG. 4A in to minimize testing duration. In particular, as shown at reference numeral 400, the ten iterations of Test 1 can be run in parallel on POWER platforms 1 and 2, with each platform allocated its own IBM FlashSystem data storage system. This allocation leaves the x86 platform and one IBM FlashSystem data storage system available for allocation to run one of the next highest priority tests (e.g., Test 2), as shown at reference numeral 402. Because changing the firmware version of the IBM FlashSystem data storage system has a time cost of 0.5 hours in this example, all ten iterations of Test 2 are completed prior to executing Test 3. If there were no time cost to change the firmware version, Tests 2 and 3, which are of equal priority, could alternatively be run round-robin. Once the ten iterations of Test 1 complete, two POWER platforms and two IBM 2 FlashSystem data storage systems will be available. Consequently, test director 200 schedules installation of AIX V7.1 on both POWER platforms, as shown at reference numeral 404a and 404b. Thereafter, POWER platforms 1 and 2 can be utilized to run Test 4 in parallel (reference numeral 406).

FIG. 4A further illustrates that test director 200 may schedule installation of firmware version 1.4.6.0 on the IBM Flashsystem data storage system allocated to the x86 platform following conclusion of the ten iterations of Test 2 (reference numeral 408). Following this firmware change, test director 200 schedules the x86 platform to run Test 3 (reference numeral 410).

Returning to FIG. 3, following the scheduling performed at block 308, test director 200 allocates a hardware resource set to the test suite 200 and, if necessary, applies to the allocated hardware resources set the initial software/firmware (i.e., soft) configuration(s) to begin the test suite (block 310). For example, continuing with the exemplary test suite 210, test director 200 allocates two POWER platforms and an x86 platform to execution of the test suite 210, and, if necessary, configures both POWER platforms with Red Hat® Enterprise Linux 7, configures the x86 platform with SUSE Linux Enterprise v. 12.2, and configures all three IBM FlashSystem data storage systems with firmware version 1.5.0.0.

At block 312, test director 200 then initiates execution of the test suite 210 on the allocated hardware resource set in accordance with the test suite schedule determined at block 308. Thus, for example, test director 200 may initiate the exemplary test suite on POWER platforms 1 and 2 and the x86 platform as shown in FIG. 4A. During execution of the test suite 210, test director 200 monitors for hardware resources in the hardware resource set becoming free and thus available for reallocation (block 314), as well as failure of a hardware resource in the hardware resource set (block 318).

In response to detecting that a hardware resource has become free at block 314, test director 200 reallocates the free hardware resource to run an additional test in the test suite 210, if possible, and updates the software/firmware configuration of the free hardware resource as necessary (block 316). For example, in FIG. 4A, test director 200 detects the freeing of POWER platforms 1 and 2 at the conclusion of Test 1, reallocates these platforms to run Test 4, and reconfigures these platforms with AIX V7.1.

Figure 4B:
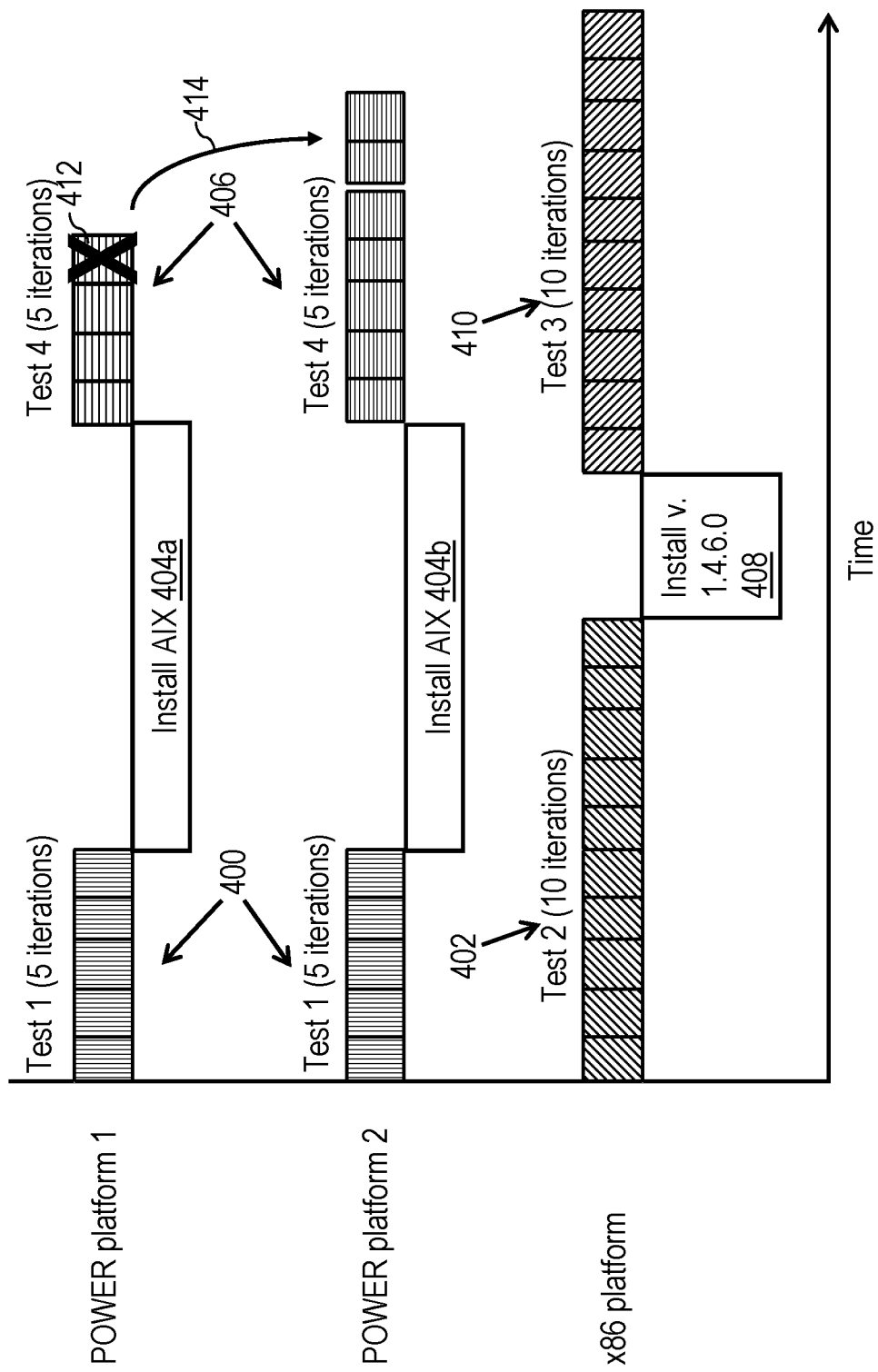

In response to detecting a failure of a hardware resource at block 318, test director 200 dynamically reallocates the hardware resource set, if possible, to continue the testing interrupted by the hardware resource failure and updates the software/firmware configuration, as needed, to complete a test-in-progress that was using the failed hardware resource (block 320). For example, in response to a failure of the IBM FlashSystem allocated to POWER platform 1 during execution of the fourth iteration of Test 4 (as represented at reference numeral 412 of FIG. 4B), test director 200 automatically and dynamically allocates POWER platform 2 to perform the fourth and fifth iterations of Test 4 that were originally scheduled to run on POWER platform 1 without any intervention of a human test administrator (reference numeral 414 of FIG. 4B).

Referring again to FIG. 3, test director 200 determines at block 322 whether or not execution of the test suite 210 is complete. If not, the process returns from block 322 to block 314 and following block, which have been described. If, however, test director 200 determines at block 322 that execution of the test suite 210 has completed, test director 200 records results of execution of the test suite for subsequent visualization and analysis (block 324). Thereafter, the process of FIG. 3 ends at block 326.

As has been described, in at least one embodiment, a processor of a testing platform determines a schedule of execution of a test suite to test a system under test (SUT) in response to receiving a test suite specification. The SUT has a hardware resource set including at least one of a set including a processor system and a data storage system, and the test suite includes a plurality of tests, each including a respective set of one or more testcases. The processor initiates execution of the test suite on the SUT in accordance with the schedule. In response to failure of a hardware resource during execution of the test suite, the processor automatically and dynamically reallocating a test in the test suite to at least one different hardware resource in the hardware resource set.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to an exemplary data processing environment, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a NAND flash memory, it should be appreciated that embodiments of the present invention can also be used with any other type of non-volatile random access memory (NVRAM). Further, although the present application has been described with reference to embodiments that use the mRBER as the single health metric upon which the health grades of blocks are determined, it should be appreciated that in other embodiments one or more additional or alternative block health metrics may instead be utilized to assign health grades to blocks.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of running a test suite in a data processing environment, the method comprising:
in response to receiving a test suite specification, a processor of a testing platform determining a schedule of execution of a test suite to test a system under test (SUT), wherein the SUT has a hardware resource set including at least one of a set including a processor system and a data storage system, and wherein the test suite includes a plurality of tests, each including a respective set of one or more testcases;
the processor initiating execution of the test suite on the SUT in accordance with the schedule; and
in response to failure of a hardware resource during execution of the test suite, the processor automatically and dynamically reallocating a test in the test suite to at least one different hardware resource in the hardware resource set.

2. The method of claim 1, wherein determining the schedule comprises:
optimizing an order of the plurality of tests based on at least one of a set including hardware resources within the hardware resource set, time costs of the plurality of tests, time costs to update soft configurations of the hardware resource set between tests, and priorities of the plurality of tests.

3. The method of claim 2, wherein:
the test suite specification specifies a number of iterations of at least one of the plurality of tests; and
the optimizing includes optimizing an order of the plurality of tests based on the number of iterations specified for the at last one of the plurality of tests.

4. The method of claim 3, wherein:
the optimizing comprises executing iterations of a particular test among the plurality of tests on multiple platforms in parallel.

5. The method of claim 1, and further comprising:
in response to failure of a hardware resource during execution of the test suite, the processor automatically and dynamically reconfiguring a soft configuration of the different hardware resource.

6. The method of claim 1, and further comprising:
in response to completion of a first test among the plurality of tests on a particular hardware resource in the hardware resources set, the processor automatically and dynamically reconfiguring a soft configuration of the particular hardware resource and thereafter running a second test among the plurality of tests on the particular hardware resource using the reconfigured soft configuration.

7. A data processing system, comprising:
a processor;
data storage coupled to the processor, wherein the data storage includes test director program code executable by the processor to cause the processor to perform:
in response to receiving a test suite specification, the processor determining a schedule of execution of a test suite to test a system under test (SUT), wherein the SUT has a hardware resource set including at least one of a set including a processor system and a data storage system, and wherein the test suite includes a plurality of tests, each including a respective set of one or more testcases;
the processor initiating execution of the test suite on the SUT in accordance with the schedule; and
in response to failure of a hardware resource during execution of the test suite, the processor automatically and dynamically reallocating a test in the test suite to at least one different hardware resource in the hardware resource set.

8. The data processing system of claim 7, wherein determining the schedule comprises:
optimizing an order of the plurality of tests based on at least one of a set including hardware resources within the hardware resource set, time costs of the plurality of tests, time costs to update soft configurations of the hardware resource set between tests, and priorities of the plurality of tests.

9. The data processing system of claim 8, wherein:
the test suite specification specifies a number of iterations of at least one of the plurality of tests; and
the optimizing includes optimizing an order of the plurality of tests based on the number of iterations specified for the at last one of the plurality of tests.

10. The data processing system of claim 9, wherein:
the optimizing comprises executing iterations of a particular test among the plurality of tests on multiple platforms in parallel.

11. The data processing system of claim 7, wherein the test director program code further causes the data processing system to perform:
in response to failure of a hardware resource during execution of the test suite, the processor automatically and dynamically reconfiguring a soft configuration of the different hardware resource.

12. The data processing system of claim 7, wherein the test director program code further causes the data processing system to perform:

in response to completion of a first test among the plurality of tests on a particular hardware resource in the hardware resources set, the processor automatically and dynamically reconfiguring a soft configuration of the particular hardware resource and thereafter running a second test among the plurality of tests on the particular hardware resource using the reconfigured soft configuration.

13. A computer program product, the computer program product comprising a computer readable storage medium having program instructions embodied therewith, the program instructions being executable by a processor of a data processing system to cause the processor to perform:

in response to receiving a test suite specification, the processor determining a schedule of execution of a test suite to test a system under test (SUT), wherein the SUT has a hardware resource set including at least one of a set including a processor system and a data storage system, and wherein the test suite includes a plurality of tests, each including a respective set of one or more testcases;

the processor initiating execution of the test suite on the SUT in accordance with the schedule; and in response to failure of a hardware resource during execution of the test suite, the processor automatically and dynamically reallocating a test in the test suite to at least one different hardware resource in the hardware resource set.

14. The data processing system of claim 13, wherein determining the schedule comprises:

optimizing an order of the plurality of tests based on at least one of a set including hardware resources within the hardware resource set, time costs of the plurality of tests, time costs to update soft configurations of the hardware resource set between tests, and priorities of the plurality of tests.

15. The data processing system of claim 14, wherein:

the test suite specification specifies a number of iterations of at least one of the plurality of tests; and the optimizing includes optimizing an order of the plurality of tests based on the number of iterations specified for the at last one of the plurality of tests.

16. The data processing system of claim 15, wherein:

the optimizing comprises executing iterations of a particular test among the plurality of tests on multiple platforms in parallel.

17. The data processing system of claim 13, wherein the program instructions further causes the data processing system to perform:

in response to failure of a hardware resource during execution of the test suite, the processor automatically and dynamically reconfiguring a soft configuration of the different hardware resource.

18. The data processing system of claim 13, wherein the program instructions further causes the data processing system to perform:

in response to completion of a first test among the plurality of tests on a particular hardware resource in the hardware resources set, the processor automatically and dynamically reconfiguring a soft configuration of the particular hardware resource and thereafter running a second test among the plurality of tests on the particular hardware resource using the reconfigured soft configuration.

* * * * *